United States Patent
Liu et al.

(10) Patent No.: US 9,665,567 B2
(45) Date of Patent: May 30, 2017

(54) SUGGESTING EMOJI CHARACTERS BASED ON CURRENT CONTEXTUAL EMOTIONAL STATE OF USER

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/859,959

(22) Filed: Sep. 21, 2015

(65) Prior Publication Data

US 2017/0083506 A1  Mar. 23, 2017

(51) Int. Cl.
  *G10L 13/00* (2006.01)
  *G10L 15/00* (2013.01)
  (Continued)

(52) U.S. Cl.
  CPC ........ *G06F 17/279* (2013.01); *G06F 3/04842* (2013.01); *G06F 17/21* (2013.01);
  (Continued)

(58) Field of Classification Search
  CPC combination set(s) only.
  See application file for complete search history.

(56) References Cited

U.S. PATENT DOCUMENTS

| 5,029,214 A | * | 7/1991 | Hollander | G10L 13/00 446/175 |
| 5,860,064 A | * | 1/1999 | Henton | G10L 13/033 204/266 |

(Continued)

FOREIGN PATENT DOCUMENTS

| JP | 2004538543 | 12/2004 |
| JP | 2013000300 | 1/2013 |

(Continued)

OTHER PUBLICATIONS

Reyes et al., "A multidimensional approach for detecting irony in Twitter," Lang Resources & Evaluation, 2013, vol. 47, pp. 239-268.*

(Continued)

*Primary Examiner* — Pierre-Louis Desir
*Assistant Examiner* — David Kovacek
(74) *Attorney, Agent, or Firm* — Steven Bennett

(57) ABSTRACT

A current perceived emotional state of a user is determined. A semantic content of text inputted by the user can also be determined, as can an ongoing context in which the text inputted by the user pertains. A current contextual emotional state of the user is determined based on the text inputted by the user (such as based on the semantic content thereof) and based on the current perceived emotional state of the user. The current contextual emotional state can also be determined based on the ongoing context in which the text inputted by the user pertains. From emoji characters mapped to different contextual emotional states, one or more selected emoji characters are determined that are mapped to the current contextual emotional state of the user. The selected emoji characters are suggested to the user to add to the text inputted by the user.

8 Claims, 4 Drawing Sheets

(51) Int. Cl.
*G06F 17/21* (2006.01)
*G06F 17/27* (2006.01)
*G06F 3/0484* (2013.01)
*G06F 17/24* (2006.01)
*G10L 13/033* (2013.01)
*G10L 15/18* (2013.01)

(52) U.S. Cl.
CPC .......... *G06F 17/24* (2013.01); *G06F 17/2765* (2013.01); *G10L 13/033* (2013.01); *G10L 15/18* (2013.01)

(56) References Cited

U.S. PATENT DOCUMENTS

| | | | |
|---|---|---|---|
| 6,578,019 B1 | 6/2003 | Suda et al. | |
| 6,601,057 B1* | 7/2003 | Underwood | G06F 17/21 707/770 |
| 7,392,475 B1* | 6/2008 | Leban | G06F 17/241 715/255 |
| 7,751,623 B1* | 7/2010 | Simmons | G06F 17/242 345/173 |
| 8,065,150 B2* | 11/2011 | Eide | G10L 13/10 704/258 |
| 8,554,701 B1* | 10/2013 | Dillard | G06N 99/005 706/12 |
| 8,588,825 B2 | 11/2013 | Jonsson | |
| 8,620,850 B2 | 12/2013 | Brown et al. | |
| 8,922,481 B1* | 12/2014 | Kauffmann | G09G 5/00 345/156 |
| 8,972,424 B2* | 3/2015 | Snell | G09B 19/00 704/251 |
| 9,014,364 B1* | 4/2015 | Koster | G10L 15/1815 379/265.01 |
| 9,043,196 B1* | 5/2015 | Leydon | G06F 3/04842 704/4 |
| 9,213,687 B2* | 12/2015 | Au | G06F 17/27 |
| 2002/0158599 A1* | 10/2002 | Fujita | B25J 13/003 318/568.11 |
| 2003/0182123 A1* | 9/2003 | Mitsuyoshi | G10L 17/26 704/270 |
| 2003/0216919 A1* | 11/2003 | Roushar | G06F 17/277 704/260 |
| 2004/0158454 A1* | 8/2004 | Polanyi | G06F 17/274 704/4 |
| 2004/0249634 A1* | 12/2004 | Degani | G10L 17/26 704/207 |
| 2005/0027525 A1* | 2/2005 | Funakura | G10L 15/26 704/235 |
| 2005/0038657 A1* | 2/2005 | Roth | G10L 15/22 704/260 |
| 2005/0054381 A1 | 3/2005 | Lee et al. | |
| 2006/0036585 A1* | 2/2006 | King | H04N 1/00244 |
| 2006/0229889 A1* | 10/2006 | Hodjat | G06F 9/4443 709/202 |
| 2006/0247915 A1* | 11/2006 | Bradford | G06F 3/0481 704/1 |
| 2007/0071206 A1* | 3/2007 | Gainsboro | H04M 3/2281 379/168 |
| 2007/0100603 A1* | 5/2007 | Warner | G06F 17/277 704/9 |
| 2007/0208569 A1* | 9/2007 | Subramanian | G10L 19/0018 704/270 |
| 2008/0151038 A1 | 6/2008 | Khouri et al. | |
| 2008/0221892 A1 | 9/2008 | Nathan et al. | |
| 2010/0111375 A1 | 5/2010 | Jones | |
| 2010/0125811 A1 | 5/2010 | Moore et al. | |
| 2011/0004624 A1* | 1/2011 | Bansal | G06F 17/30864 707/776 |
| 2011/0041153 A1 | 2/2011 | Simon et al. | |
| 2011/0099006 A1* | 4/2011 | Sundararaman | G10L 15/26 704/208 |
| 2011/0273455 A1* | 11/2011 | Powar | G06F 17/30769 345/473 |
| 2012/0030227 A1* | 2/2012 | Mital | G06F 17/30867 707/767 |
| 2012/0035924 A1* | 2/2012 | Jitkoff | G01C 21/3608 704/235 |
| 2012/0072217 A1* | 3/2012 | Bangalore | G10L 15/1807 704/243 |
| 2012/0166180 A1* | 6/2012 | Au | G06F 17/274 704/9 |
| 2012/0278064 A1 | 11/2012 | Leary et al. | |
| 2012/0304074 A1 | 11/2012 | Ooi et al. | |
| 2012/0317046 A1* | 12/2012 | Myslinski | G06Q 30/02 705/329 |
| 2013/0019163 A1* | 1/2013 | Thompson | G06F 17/30908 715/234 |
| 2013/0103386 A1* | 4/2013 | Zhang | G06F 17/2785 704/9 |
| 2013/0151237 A1* | 6/2013 | Hyde | G06F 17/2775 704/9 |
| 2013/0151508 A1* | 6/2013 | Kurabayashi | G06F 17/2223 707/723 |
| 2013/0159919 A1* | 6/2013 | Leydon | G06F 3/0236 715/780 |
| 2013/0275899 A1* | 10/2013 | Schubert | G06F 3/0481 715/765 |
| 2014/0035823 A1* | 2/2014 | Khoe | G06F 3/02 345/171 |
| 2014/0046660 A1 | 2/2014 | Kamdar | |
| 2014/0088954 A1* | 3/2014 | Shirzadi | G06F 17/24 704/9 |
| 2014/0095150 A1* | 4/2014 | Berjikly | G06F 17/2785 704/9 |
| 2014/0108006 A1* | 4/2014 | Vogel | G06F 17/28 704/9 |
| 2014/0236596 A1* | 8/2014 | Martinez | G06F 17/2785 704/235 |
| 2015/0025403 A1 | 1/2015 | Chang et al. | |
| 2015/0046371 A1* | 2/2015 | Leary | G06F 17/274 705/347 |
| 2015/0052462 A1 | 2/2015 | Kulkarni | |
| 2015/0095020 A1 | 4/2015 | Leydon | |
| 2015/0121285 A1* | 4/2015 | Eleftheriou | G06F 3/04842 715/773 |
| 2015/0186369 A1* | 7/2015 | Yan | G06F 17/30997 715/201 |
| 2015/0248424 A1* | 9/2015 | Berube | G06F 17/211 715/234 |
| 2015/0350118 A1* | 12/2015 | Yang | H04L 51/02 715/752 |
| 2016/0042359 A1* | 2/2016 | Singh | G06Q 30/016 704/2 |
| 2016/0071119 A1* | 3/2016 | Blanchflower | G06F 17/2785 705/7.29 |

FOREIGN PATENT DOCUMENTS

| | | |
|---|---|---|
| KR | 1020110026218 | 3/2011 |
| WO | 2014102722 | 12/2013 |

OTHER PUBLICATIONS

Neviarouskaya et al., "Textual Affect Sensing for Sociable and Expressive Online Communication," ACII 2007, LNCS 4738, 2007 Springer-Verlag, pp. 218-229.*

Devillers et al. "Annotation and Detection of Emotion in a Task-oreiented Human-Human Dialog Corpus," ISLE workshop, Dec. 2002, 10 pages.*

List of IBM Patents or Applications Treated as Related, dated Jan. 7, 2015.

Kalyan, Chetan et al., "Detecting emotional scenes using Semantic Analysis on Subtitles", Stanford University, CS224N Final Project, Jun. 4, 2009, 11 pp.

Kim, Sunghwan Mac, "Recognising Emotions and Sentiments in Text", Thesis—University of Sydney, Apr. 2011, 128 pp.

Shivhare, Shiv Naresh et al., "Emotion Detection from Text",

(56) References Cited

OTHER PUBLICATIONS

Department of CSE and IT, Maulana Azad National Institute of Technology, Bhopal, Madhya Pradesh, India, 2012, 7 pp.
Aman, Saima, "Recognizing Emotions in Text", Master of Computer Science Thesis, University of Ottawa, 2007, 105 pp.
Aman, Saima et al., "Identifying Expressions of Emotion in Text", TSD 2007, LNAI 4629, Springer-Verlag Berlin Heidelberg 2007, pp. 196-205.
Mihalcea, Rada et al., "Corpus-based and Knowledge-based Measures of Text Semantic Similarity", 2006, American Association for Artificial Intelligence (www.aaai.org), pp. 775-780.
Adolphs, Ralph, "Recognizing Emotion From Facial Expressions: Psychological and Neurological Mechanisms", University of Iowa College of Medicine, Behavioral and Cognitive Neuroscience Reviews vol. 1 No. 1, Mar. 2002, pp. 21-62.
Strapparava, Carlo et al., "Learning to Identify Emotions in Text", SAC'08 Mar. 16-20, 2008, Fortaleza, Cear'a, Brazil, 5 pp.
Schut, Marleen et al., "Biometrics for Emotion Detection (BED): Exploring the combination of Speech and ECG", 1st International Workshop on Bio-inspired Human-Machine Interfaces and Healthcare Applications—B-Interface 2010, Jan. 21, 2010, Valencia, Spain , pp. 51-58.
Chandler, Clive et al., "Biometric Measurement of Human Emotions", International Journal of Computing Science and Communication Technologies, vol. 4 No. 2, Jan. 2012, 5 pp.
Ramirez, Geovany et al., "Color Analysis of Facial Skin: Detection of Emotional State", 2014 IEEE Conference on Computer Vision and Pattern Recognition Workshops, Jun. 23-28, 2014, pp. 474-479.
Erdem, Ernur Sonat et al., "Efficient Recognition of Human Emotional States from Audio Signals", 2014 IEEE International Symposium on Multimedia, Dec. 10-12, 2014, 4 pp.
Fischer, Agneta H. et al., "Social influences on the emotion process", Chapter in Stroebe, W. & Hewstone, M. (2003). European Review of Social Psychology, 14, pp. 171-202.
Klingensmith, Ashton, "The Capacity to Delineate and Interpret Emotion in Text Messages", Thesis—Liberty University, 2012, 34 pp.
Cullen, Charlie et al., "Generation of High Quality Audio Natural Emotional Speech Corpus using Task Based Mood Induction", International Conference on Multidisciplinary Information Sciences and Technologies Extremadura (InSciT), Merida, Spain. Oct. 25-28, 2006, 10 pp.
Ptaszynski, Michael, "Towards Context Aware Emotional Intelligence in Machines: Computing Contextual Appropriateness of Affective States", International Joint Conferences on Artificial Intelligence, Jul. 2009, pp. 1469-1474.
Surbhi, Vishal Arora, "A Face Identification Technique for Human Facial Image", International Journal of Computer Science and Information Technologies, vol. 3 (6), 2012, pp. 5390-5393.
Foltz, Peter W., "Latent Semantic Analysis for Text-Based Research", online <http://www-psych.nmsu.edu/~pfoltz/reprints/BRMIC96.html>, Behavior Research Methods, Instruments and Computers. 28(2), pp. 197-202.
Polzin, Thomas S. et al., "Detecting Emotions in Speech", Proceedings of the CMC, 1998, 7 pp.
Conati, Cristina et al., "A Study on Using Biometric Sensors for Monitoring User Emotions in Educational Games", Workshop on Assessing and Adapting to User Attitudes and Affect: Why, When and How. 2003. 7 pp.
Yazdani, Majid et al., "Computing Text Semantic Relatedness using the Contents and Links of a Hypertext Encyclopedia", Artificial Intelligence, Nov. 19, 2012, 32 pp.
Weiss-Meyer, Amy, "A Peek Inside the Non-Profit Consortium That Makes Emoji Possible", The New Republic, Jun. 27, 2014, online <http://www.newrepublic.com/article/118421/emoji-made-possible-non-profit-consortium>, 3 pp.
Chalabi, Mona, "The 100 Most-Used Emojis", FiveThirtyEight, Jun. 5, 2014, online <http://fivethirtyeight.com/datalab/the-100-most-used-emojis/>, 7 pp.
Semantria Web Demo, accessed online Sep. 21, 2015, <https://semantria.com/demo>, 2 pp.
Ismael, Chris, "List of 20+ Sentiment Analysis APIs", Apr. 24, 2013, online <http://blog.mashape.com/list-of-20-sentiment-analysis-apis/>, 4 pp.
Blagdon, Jeff, "How emoji conquered the world", The Verge, Mar. 4, 2013, online <http://www.theverge.com/2013/3/4/3966140/how-emoji-conquered-the-world>.
Sentiment Analysis, wikipedia.com, Jun. 27, 2014, online <https://en.wikipedia.org/wiki/Sentiment_analysis>, 7 pp.
LiKamWa, Robert et al., "MoodScope: Building a Mood Sensor from Smartphone Usage Patterns", MobiSys'13, Jun. 25-28, 2013, Taipei, Taiwan. 13 pp.
Ulinski, Morgan et al., "Finding Emotion in Image Descriptions", WISDOM'12, Aug. 12, 2012, Beijing, China, 7 pp.

\* cited by examiner

SUGGESTING EMOJI CHARACTERS BASED ON CURRENT CONTEXTUAL EMOTIONAL STATE OF USER

BACKGROUND

Particularly with the advent of mobile computing devices like smartphones, emoji characters have become a popular way by which users enhance text messages and posts, within private text messages and within social networking posts. An emoji is literally a picture character or pictograph, and is a single character with a unique code point value as part of a text string that can provide additional meaning to text or provide contextual information to the text to assist in interpretation of the text, among other purposes. To enter an emoji character, on smartphones, for example, a user may switch from an alphabetic keyboard to an emoji keyboard and select the desired emoji.

SUMMARY

An example method includes determining, by a computing device, a current perceived emotional state of a user. The method includes determining, by the computing device, a current contextual emotional state of the user based on text inputted by the user and based on the current perceived emotional state of the user. The method includes, from emoji characters mapped to different contextual emotional states, determining, by the computing device, one or more selected emoji characters that are mapped to the current contextual emotional state of the user. The method includes suggesting, by the computing device, the selected emoji characters to the user to add to the text inputted by the user.

An example computer program product includes a computer readable storage medium having stored thereon program instructions. The instructions are executable by a computing device to cause the computing device to determine a current perceived emotional state of a user, and determine a semantic content of text inputted by the user. The instructions are executable by the computing device to cause the computing device to determine a current contextual emotional state of the user based on the semantic content of the text inputted by the user and based on the current perceived emotional state of the user. The instructions are executable by the computing device to cause the computing device to, from emoji characters mapped to different contextual emotional states, determine one or more selected emoji characters that are mapped to the current contextual emotional state of the user, and to suggest the selected emoji characters to the user to add to the text inputted by the user.

An example computing device includes a processor, a memory, and program instructions stored in the memory and executable by the processor. The instructions are executable by the processor to determine a current perceived emotional state of a user, determine semantic content of text inputted by the user, and determine an ongoing context in which the text inputted by the user pertains. The instructions are executable by the processor to determine a current contextual emotional state of the user based on the ongoing context in which the text inputted by the user pertains, based on the semantic content of the text inputted by the user, and based on the current perceived emotional state of the user. The instructions are executable by the processor to, from emoji characters mapped to different contextual emotional states, determine one or more selected emoji characters that are mapped to the current contextual emotional state of the user, and to suggest the selected emoji characters to the user to add to the text inputted by the user.

DETAILED DESCRIPTION

As noted in the background section, emoji characters are single picture characters that have become popular to add to text messages and posts within private text messages and social network posts. Examples of text messages include those transmitted over the short message service (SMS) that is ubiquitous among mobile phone operators, as well as those transmitted over proprietary message services that require a particular type of smartphone or installation of a particular type of computer program or "app." Examples of social networking posts include those posted using social networking services like those run by Facebook, Inc., of Menlo Park, Calif., and Twitter, Inc., of San Francisco, Calif.

A difficulty with using emoji characters is that there are multitudes of different such characters, making selection of an appropriate character difficult to accomplish, particularly on a mobile computing device like a smartphone. Many users also have difficulty knowing what particular emoji characters, a problem borne at least in part in the initial usage of such characters in a country, Japan, which culturally associates certain meanings to certain characters in ways that people in other countries do not. As a result of these downsides, a good number of users use a limited number of emoji characters, if any at all.

Techniques disclosed herein ameliorate these problems. In particular, when a user enters text, such as a sentence or a complete message or post, one or more appropriate emoji characters are suggested to the user. The user can select a desired emoji character or characters to add to his or her message or post. Because just a limited number of emoji characters are suggested to the user, entry is more easily accomplished by simply selecting one of the suggested characters, instead of having to scroll over multiple pages or screens of emoji characters to locate the most appropriate character. Users may find themselves as a result using a richer set of emoji characters, since they will know that the emoji characters suggested to them are appropriate to add. That is, the users will be able to intrinsically discern the meaning of emoji characters because just relevant and appropriate such characters are suggested for adding to their text messages and posts.

Figure 1:
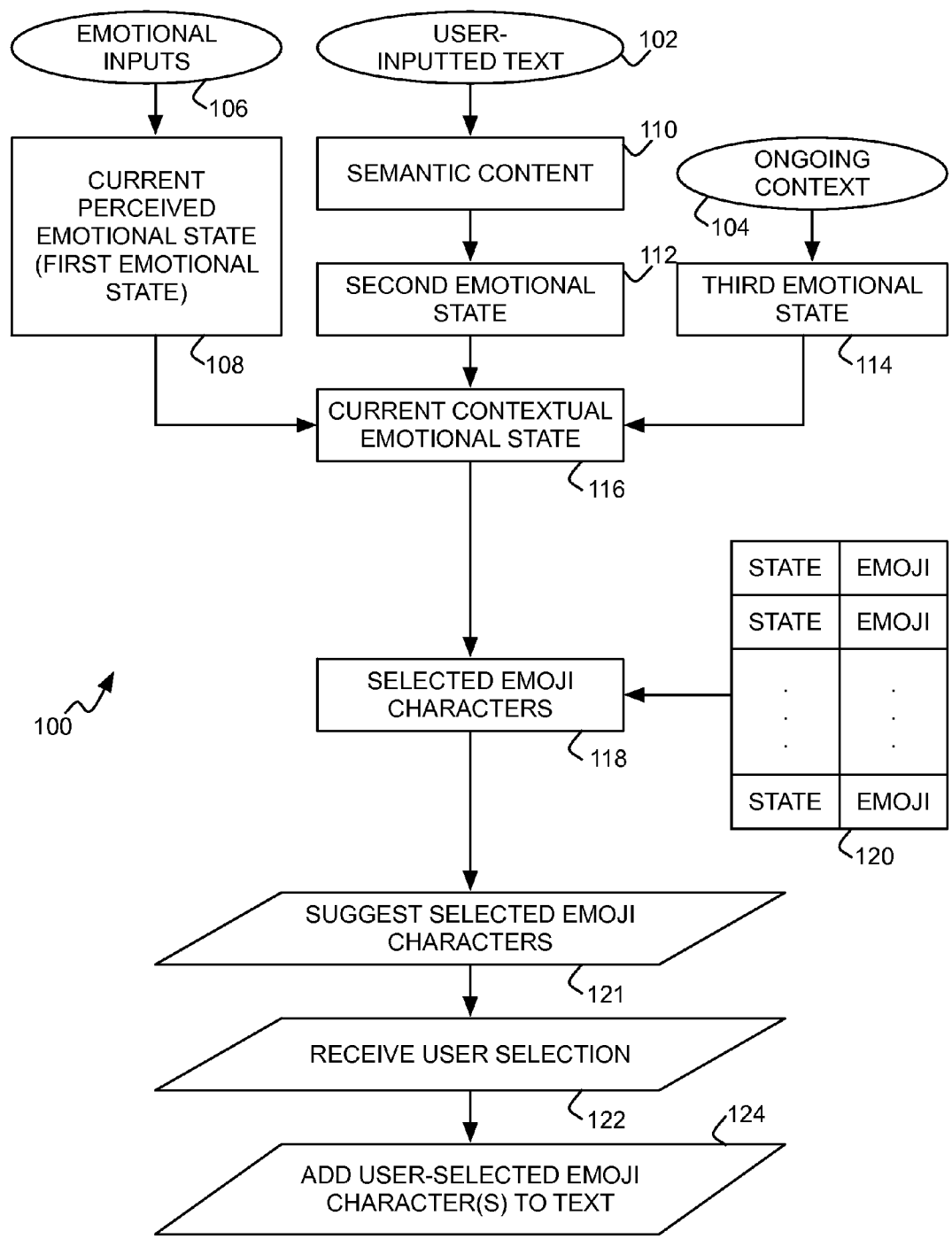
FIG. 1 is a diagram of a process flow by which emoji characters are suggested to the user.

FIG. 1 shows an example process flow 100 by which appropriate emoji characters can be suggested for selection by the user. Ovals and rounded rectangles in FIG. 1 indicate data that is not generated within the process flow 100 itself, but rather are received within the flow 100. Rectangles indicate data that is generated or determined within the process flow 100. Arrows indicate the order of process flow and the inputs on which basis the data in the rectangles is determined. Parallelograms indicate parts, steps, or acts that are also performed within the process flow 100.

A user inputs text 102 in an ongoing context 104. The text 102 may be a text message within a text messaging service or a post within a social networking service. The ongoing context 104 is the context in which the text 102 has been input, and may include other texts, by the same and other users, that have been entered. That is, the context 104 is the context to which the text 102 pertains. For example, the text 102 may be entered as part of an ongoing conversation between the user and one or more other users, where the prior texts by the same and the other users form the ongoing context 104. As another example, the text 102 may be a comment, response, or reply to a post within a social networking service that has other comments, responses, or replies that have already been entered, where the original post and the other comments, responses, or replies form the ongoing context 104.

The emotional inputs 106 can include one or more of the following. The emotional inputs 106 can include biometric information of the user that entered the text 104, as detected by a biometric sensing device, such as a heart rate sensor, a breathing rate sensor, a perspiration sensor, and so on. Such biometric information is thus physiological measurements of the user on which basis an emotional state of the user can be determined. The emotional inputs 106 can include a facial image of the user as detected by a camera device, where the facial image can exhibit frowns, furrowed brows, smiles, smirks, and so on, on which basis an emotional state of the user can be determined. The emotional inputs 106 can include recorded audio of the user as detected by an audio recorded device, where the audio can exhibit laughter, yelling, snickering, and so on, on which basis an emotional state of the user can be determined. The emotional inputs 106 can further include the user-inputted text 102 itself.

A current perceived emotional state 108, which is a first emotional state, of the user is determined from the emotional inputs 106. The emotional state 108 may not reflect the semantic content, or meaning of the user-inputted text 102. Rather, the emotional state 108 reflects a perceived emotional state from the user's biometric information, facial image, recorded audio, and the text 102 (the latter in one implementation without reflecting the semantic content of the text 102).

Determining the emotional state 108 from biometric information of the user can be achieved in a number of different ways. Several approaches are described, for instance, in C. Chandler et al., "Biometric Measurement of Human Emotions," TECHNIA—International Journal of Computing Science and Communication Technologies, vol. 4, no. 2, January 2012; C. Conati, "A Study on Using Biometric Sensors for Monitoring User Emotions in Educational Games," published at http://www.cs.ubc.ca/~conati/my-papers/um03affect-camera-conati.pdf, and published no later than 2004; and M. H. Schut, "Biometrics for Emotion Detection (BED): Exploring the combination of Speech and ECG," Conference: B-Interface 2010—Proceedings of the $1^{st}$ International Workshop on Bio-inspired Human-Machine Interfaces and Healthcare Applications, in conjunction with BIOSTEC 2010, Valencia, Span, Jan. 21-22, 2010.

Determining the emotional state 108 from facial images of the user can be achieved in a number of different ways. Several approaches are described, for instance, in R. Adolphs, "Recognizing Emotion from Facial Expressions: Psychological and Neurological Mechanisms," Behavioral and Cognitive Neuroscience Reviews, vol. 1, no. 1, March 2002; G. A. Ramirez et al., "Color Analysis of Facial Skin: Detection of Emotional State," Computer Vision and Pattern Recognition Workshops (CVPRW), 2014 IEEE Conference, Jun. 23-28, 2014; and Surbhi, "A Face Identification Technique for Human Facial Image," International Journal of Computer Science and Information Technologies, vol. 3(6), 2012.

Determining the emotional state 108 from recorded audio (e.g., speech) of the user can be achieved in a number of different ways. Several approaches are described, for instance, in E. S. Erdem et al., "Efficient Recognition of Human Emotional States from Audio Signals," 2014 IEEE International Symposium on Multimedia; C. Cullen et al, "Generation of High Quality Audio Natural Emotional Speech Corpus using Task Based Mood Induction," International Conference on Multidisciplinary Information Sciences and Technologies Extremadura, Merida, Spain, Oct. 25-28, 2006; and T. S. Polzin et al., "Detecting Emotions in Speech," published at http://www.ri.cmu.edu/pub_files/pub1/polzin_thomas_1998_1/polzin_thomas_1998_1.pdf, 1998.

Determining the emotional state 108 from text entered by the user can be achieved in a number of different ways. Several approaches are described, for instance, in S. N. Shivare, "Emotion Detection from Text," published at http://arxiv.org/ftp/arxiv/papers/1205/1205.4944.pdf, 2012; C. Strapparava et al., "Learning to Identify Emotions in Text," SAC'08, Mar. 16-20, 2008; and "Recognizing Emotions and Sentiments in Text," S. M. Kim, Masters Thesis at the University of Sydney, April 2011.

From the user-inputted text 102, the semantic content 110 of the text 102 is determined. The semantic content 110 of the text 102 can include the meaning of the text 102 in a manner in which computational processing can understand. Determining the semantic content 110 of the text 102 can be achieved in a number of different ways. Several approaches are described, for instance, in the references noted in the previous paragraph, as well as in P. W. Foltz, "Latent Semantic Analysis for Text-Based Research," Behavior Research Methods, Instruments and Computers, vol. 28(2), 1996; M. Yazdani et al., "Computing Text Semantic Relatedness . . . ," Artificial Intelligence, Nov. 19, 2012; and R. Mihalcea et al., "Corpus-based and Knowledge-based Measures of Text Semantic Similarity," American Association for Artificial Intelligence, 2006.

A second emotional state 112 of the user is determined from the semantic content 110 of the text 102. This emotional state 112 of the user is thus another measure of the user's emotional state, in addition to the first emotional state 108 determined from the emotional inputs 108. Determining the second emotional state 112 from the semantic content 110 of the text 102 can be achieved in a number of different ways. Several approaches are described, for instance, in the references noted with respect to determining the first emotional state 108 from text, as well as in S. Aman, "Recognizing Emotions in Text," Masters Thesis at the University of Ottawa, 2007; S. Aman et al., "Identifying Expressions of Emotion in Text," TSD 2007; and C. Kalyan et al., "Detecting emotional scenes using Semantic Analysis on Subtitles," Stanford University CS224N Final Project, Jun. 4, 2009.

It is noted that in the process flow 100, the semantic content 110 of the text 102 is first explicitly determined from the text 102, and then the second emotional state 112 is determined from this semantic content 110. However, in another implementation, the second emotional state 112 is determined from the text 102, where the semantic content 110 may be implicitly determined as part of this process. In this respect, the second emotional state 112 may be the same as the first emotional state 108 if the latter is generated from the text 102, and therefore in this implementation the first emotional state 108 is generated from emotional inputs 106 other than the text 102.

A third emotional state 114 of the user may be determined from the ongoing context 104 within which the text 102 has been input by the user. This emotional state 114 of the user is thus another measure of the user's emotional state, in addition to the first emotional state 108 and the second emotional state 112 of the user. Determining the third emotional state 114 from the ongoing context 104 can be achieved in a number of different ways. For instance, the same methodology used to determine the second emotional state 112 may be used to determine the third emotional state 114, but where the entire corpus of text entered by the user (and in one implementation, other users' entered text in the same context) is considered. Other approaches that can be employed are described in, for instance, A. H. Fischer, "Social influences on the emotion process," European Review of Social Psychology, 2003; M. Ptaszynski, "Towards Context Aware Emotional Intelligence in Machines," Proceedings of the 21$^{st}$ International Joint Conference on Artificial Intelligence, 2009; A. Klingensmith, "The Capacity to Delineate and Interpret Emotion in Text Messages," Senior Thesis, Liberty University, Spring 2012.

From the first emotional state 108, the second emotional state 112, and where determined the third emotional state 114, the current contextual emotional state 116 of the user is determined. The emotional state 116 can be considered as an aggregate of the emotional states 108, 112, and 114 in one implementation, to most accurately reflect the actual emotional state of the user while he or she inputted the text 102 within the ongoing context 104. Different mechanisms by which the emotional state 116 can be determined can be employed. In general, the emotional state 116 is one of a predetermined number of emotional states, such as happy, sad, angry, depressed, ironic, and so on.

For instance, the emotional states 108, 112, and 114 may each be determined as weighting of one or more different emotions. Therefore, these weights are combined to determine the current contextual emotional state 116. If the combination of the weights yields an emotion with a weight greater than a threshold, then it can be concluded that a current contextual emotion state 116 has been successfully determined.

As one example, the emotional state 108 may be determined as 0.8 happy and 0.2 sad. The emotional state 112 may be determined as 0.7 happy and 0.1 angry. The emotional state 114 may be determined as inapposite—that is, no significant emotion may have been determined as part of the state 114. Therefore, the current contextual emotional state 116 is the summation of these three states 108, 112, and 114, where the state 114 is not effectively considered since it is inapposite. As a result, the current contextual emotional state 116 is initially 1.5 happy, 0.2 sad, and 0.1 angry. If 1.5 is greater than a threshold, then the current contextual emotional state 116 is determined as happy.

Once the current contextual emotional state 116 of the user has been determined, one or more selected emoji characters 118 are determined that map to the current contextual emotional state 116. In one implementation, this is achieved by referencing a predetermined database 120 that maps each of a number of emoji characters to a corresponding emotional state. Therefore, for a given emotional state, there may be more than one emoji character mapped thereto. Different emotional states can be differing degrees of the same base emotion, such as happy, happier, and happiest, where each such state has one or more emoji characters mapped thereto. The mapping of the predetermined database 120 can be defined, and redefined as desired, by users and/or vendors. Furthermore, the database 120 can vary by the country in which a user or the recipient of the user's text is located, since the meaning of emoji characters can differ by culture.

The selected emoji characters 118 that have been determined are suggested to the user in part 121. (It is noted that the emoji characters 118 are selected emoji characters in that they are particular emoji characters that have been determined that map to the current contextual emotional state 116, as opposed to being selected by the user.) For example, on a smartphone or other mobile computing device, a small bubble, window, or other graphical user interface (GUI) element may be displayed that shows the selected emoji characters 118 for selection by the user. The GUI element may be automatically displayed, or may be displayed by the user selecting an option corresponding to showing emoji characters. For example, if the user selects a virtual keyboard corresponding to emoji characters, the selected emoji characters 118 may be displayed towards the beginning of the list of such characters, either before or immediately after emoji characters that the user previously entered.

The user's selection of one of the selected emoji characters 118 suggested in part 120 is received in part 122, and then added or appended in part 124 to the text 102 that the user has entered. The process flow 100 can be repeated each time a user enters text. For example, each time a user completes a sentence, ending in punctuation such as a period, question mark, or exclamation point, the process flow 100 can be performed. As another example, just prior to the user posting or sending the text 102 the process flow 100 can be performed. As a third example, after the user has entered the text 102 and has paused for a predetermined length of time, it may be concluded that the user has finished entering the text 102 such that the process flow 100 is performed upon detection of this pause. As a final example, the process flow 100 can be manually triggered, when the users requests a suggested emoji character or switches to an emoji character keyboard, as noted above.

Figure 2:
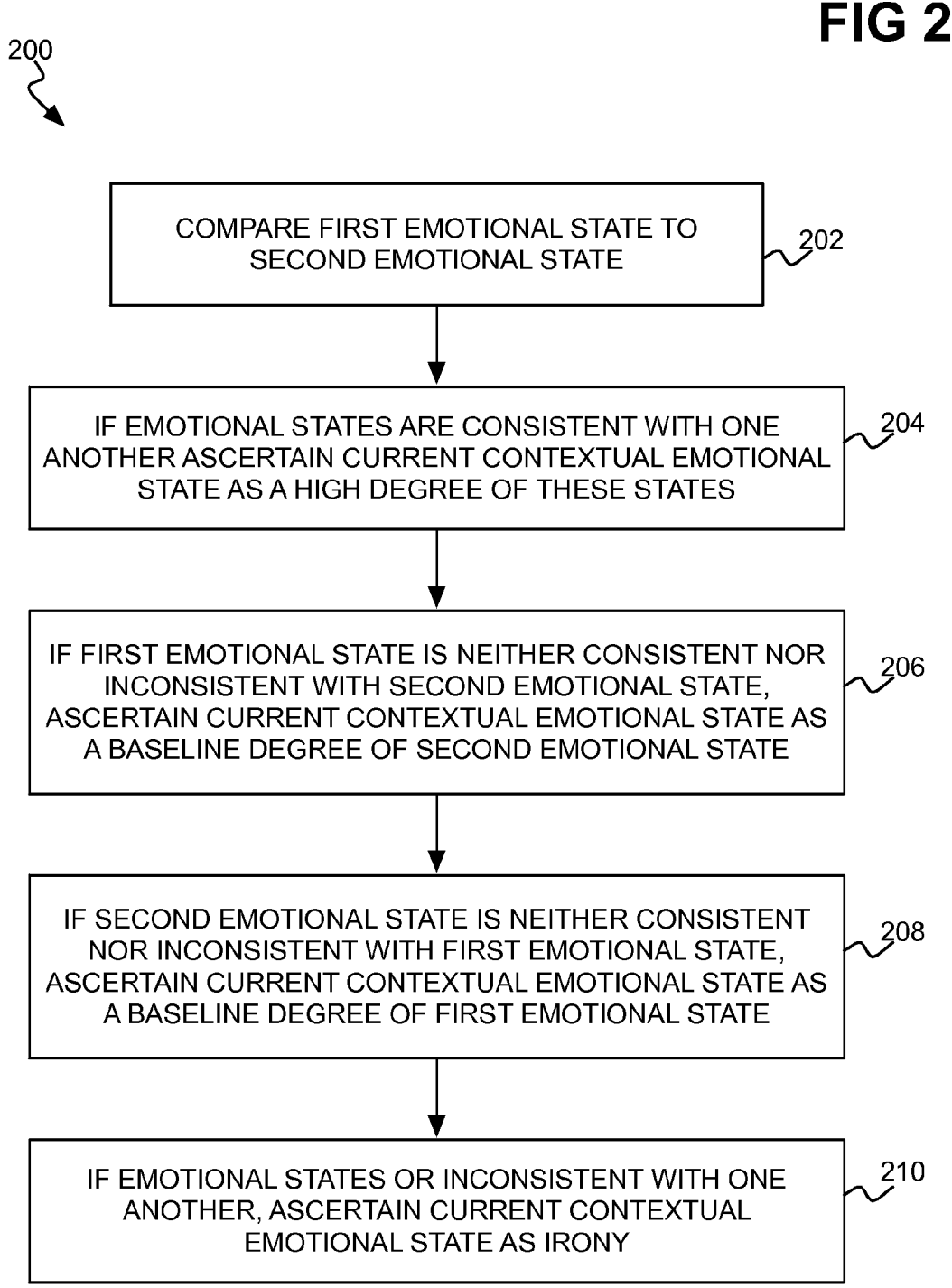
FIGS. 2 and 3 are flowcharts of example methods to ascertain a current contextual emotional state of a user in different implementations.

FIG. 2 shows an example method 200 for determining the current contextual emotional state 116 in one implementation, where the third emotional state 114 is not determined. That is, the method 200 determines the current contextual emotional state 116 based on just the first emotional state 108 and the second emotional state 112. In the method 200, the emotional states 108 and 112 are each either an emotional state without weighting, such as happy, sad, angry, depressed, and so on, or an inapposite emotional state.

For instance, if an emotional state has a weighting less than a threshold, then the state may have been determined as being inapposite, and if the emotional state has a weighting greater than the threshold, then the state is determined as being this state. For example, the threshold may be 0.6. The first emotional state 108 may have been determined as 0.2 angry, 0.4 sad, and 0.1 happy. In this case, the first emotional state 108 is deemed as being inapposite, since none of these emotions is greater than 0.6. The second emotional state 112 may have been determined as 0.9 angry and 0.7 sad. In this case, the second emotional state is deemed as being angry, since angry is the highest emotion, and has a weighting greater than the threshold.

The first emotional state 108 is compared in the method 200 to the second emotional state 112 (202). Based on this comparison, and assuming that at least one of the emotional states 108 and 112 is not inapposite, the current contextual emotional state 116 can be determined as follows. If the two emotional states 108 and 112 are consistent with one another, then the current contextual emotional state 116 is ascertained as a high degree of these states 108 and 112 (204). For example, if both the emotional states 108 and 112 are happy, then the current contextual emotional state 116 is ascertained as very happy (i.e., happier).

If the first emotional state 108 is neither inconsistent nor consistent with the second emotional state 112 (viz., the first emotional state 108 is inapposite), then the current contextual emotional state 116 is ascertained as a baseline degree of the second emotional state 112 (206). For example, if the emotional state 108 is inapposite and the emotional state 112 is happy, then the current contextual emotional state 116 is ascertained as happy (as opposed to very happy or happier). Similarly, if the second emotional state 112 is neither inconsistent nor consistent with the first emotional state 108 (viz., the second emotional state 108 is inapposite), then the current contextual emotional state 116 is ascertained as a baseline degree of the first emotional state 108 (208).

If the emotional states 108 and 112 are inconsistent with one another (e.g., they contradict each other), then the current contextual emotional state 116 can be ascertained as the user being ironic—that is, irony (210). For instance, if the emotional state 108 is happy and the emotional state 112 is angry, then the current contextual emotional state 116 is irony. As a concrete example, the user may be laughing, but writing something angry in tone, such that it is ascertained that the user's current contextual emotional state 116 is one of being ironic.

The method 200 of FIG. 2 thus provides granularity in the emoji characters that are suggested to the user. A happy emoji character may be a simple smiley face, whereas a very happy emoji character may be a smiley face that has a very pronounced smile. It is noted that in one implementation, the emoji character corresponding to irony may be a winking smiley face.

Figure 3:
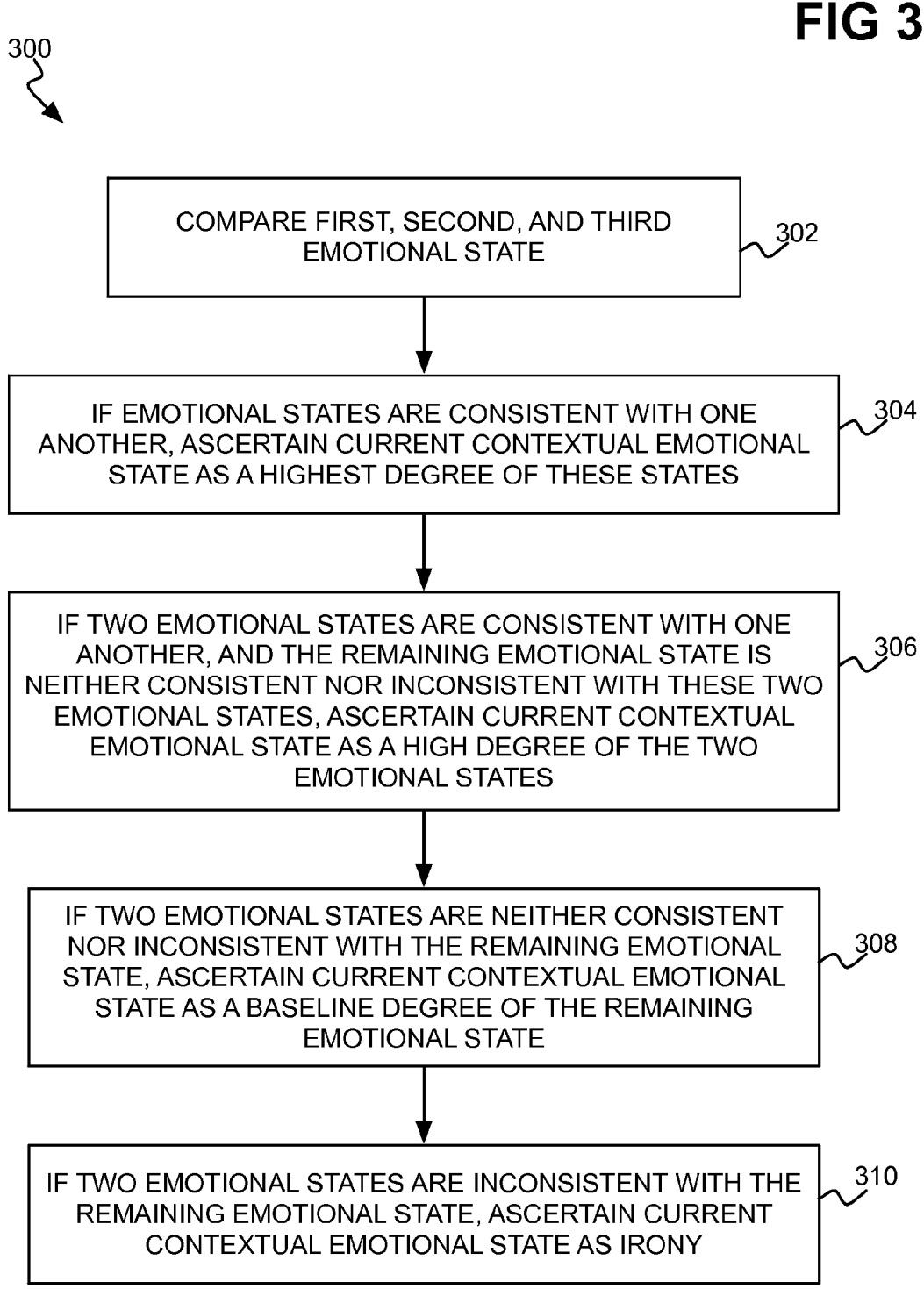

FIG. 3 shows an example method 300 for determining the current contextual emotional state 116 in another implementation, in which the third emotional state 114 is determined. That is, the method 300 determines the current contextual emotional state 116 based on the emotional states 108, 112, and 114. As in the method 200, the emotional states 108, 112, and 114 are each either an emotional state without weighting, or an inapposite emotional state.

The emotional states 108, 112, and 114 are compared to one another (302). Based on this comparison, and assuming that at least two of the emotional states 108, 112, and 114 is not inapposite, the current contextual emotional state 116 can be determined as follows. If the three emotional states 108, 112, and 114 are consistent with one another, then the current contextual emotional state 116 is ascertained as a highest degree of these states 108, 112, and 114 (304). For example, if all three emotional states 108, 112, and 114 are happy, then the current contextual emotional state 116 is ascertained as happiest.

If two of the emotional states 108, 112, and 114 are consistent with one another, and the remaining emotional state is neither consistent nor inconsistent with these two emotional states, then the current contextual emotional state 116 is ascertained as a high degree of the two emotional states (306). For example, if the emotional state 112 is inapposite and the emotional states 108 and 114 are each happy, then the current contextual emotional state 116 is ascertained as happier or very happy (as opposed to just happy, or happiest). By comparison, if two of the emotional states 108, 112, and 114 are neither inconsistent nor inconsistent with the remaining emotional state, then the current contextual emotional state 116 is ascertained as a baseline degree of the non-inapposite emotional state (308). For example, if the emotional state 112 is happy and the emotional states 108 and 114 are each inapposite, then the current contextual emotional state 116 is ascertained as happy (as opposed to happier or happiest).

If two of the emotional states 108, 112, and 114 are inconsistent with the remaining emotional state (or if all three emotional states 108, 112, and 114 are inconsistent with one another), then the current contextual emotional state 116 can be ascertained as irony (310). The method 300 of FIG. 3 provides even greater granularity in the emoji characters that are suggested to the user than the method 200 of FIG. 2. A happy emoji character may be a simple smiley face, a happier emoji character may be a smiley face that has a very pronounced smile, and a happiest emoji character may be a smiley face with a toothy smile (i.e., in which the face's teeth can be seen), as an example.

Figure 4:
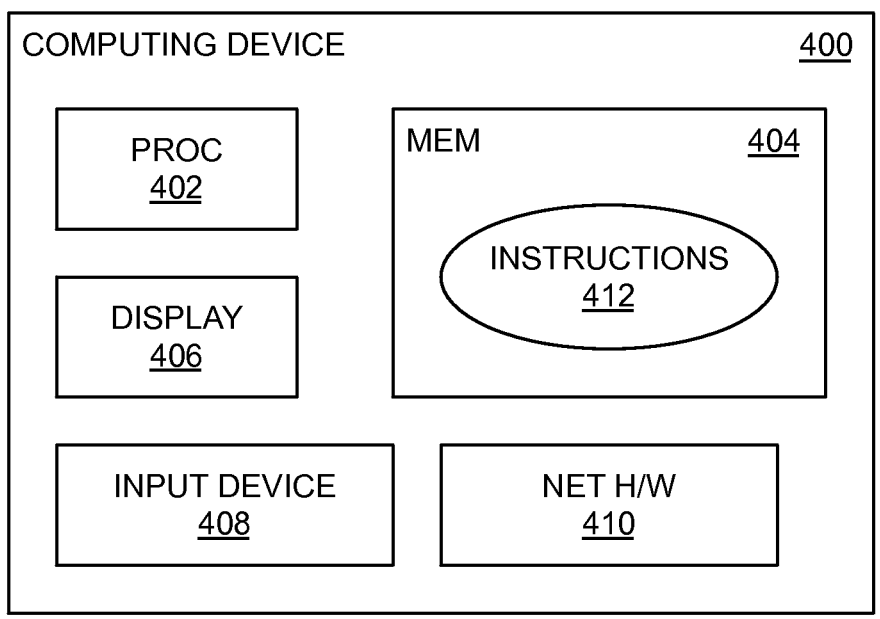
FIG. 4 is a flowchart of an example computing device.

FIG. 4 shows an example computing device 400 that can implement the techniques that have been described. The computing device 400 may be a mobile computing device, such as smartphone or tablet computing device. The computing device 500 may be a computer, such a desktop computer, or a laptop or notebook computer. The computing device 400 can include a processor 402, a memory 404, a display 406, an input device 408, and network hardware 410.

The memory 404 can be a volatile or non-volatile memory device, and stores program instructions 412 that the processor 402 executes to perform the process flow 100 and/or the methods 200 and 300 that have been described. The display 406 displays the emoji characters suggested by the techniques disclosed herein and the text input by the user, and can be a flat-screen display device. The input device 408 may be or include a physical keyboard, a touchscreen, a pointing device such as a mouse or touchpad, and so on. The user enters text via the input device 408 and can select one of the suggested emoji characters via the device 408. The network hardware 410 permits the computing device 400 to communicate with communication networks, such as mobile phone networks, the Internet, wireless and/or wired networks, and so on. Via the network hardware 410, then, the computing device 400 permits the user to send and receive text messages and/or access social networking services.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:
1. A method comprising:
   determining, by a computing device, a first emotional state of a user, as a current perceived emotional state of the user from information other than text inputted by the user on the computing device, by one or more of:
      determining the current perceived emotional state from biometric information of the user detected by a biometric sensing device;
      determining the current perceived emotional state from a facial image of the user detected by a camera device;
      determining the current perceived emotional state from recorded audio of the user detected by an audio recording device;
   determining, by the computing device, a second emotional state of the user, from a semantic content of the text inputted by the user;
   determining, by the computing device, a current contextual emotional state of the user based on the text inputted by the user on the computing device and based on the current perceived emotional state of the user by:
      when the first emotional state and the second emotional state are consistent with one another, ascertaining the current contextual emotional state of the user as a high degree of the first emotional state of the user;
      when the first emotional state is inapposite, ascertaining the current contextual emotional state of the user as a baseline degree of the second emotional state;

when the second emotional state is inapposite, ascertaining the current contextual emotional state of the user as a baseline degree of the first emotional state;
when the first emotional state and the second emotional state are inconsistent with one another, ascertaining the current contextual emotional state of the user as irony;
from a plurality of emoji characters mapped to different contextual emotional states, determining, by the computing device, one or more selected emoji characters that are mapped to the current contextual emotional state of the user, each emoji character being a picture character or pictograph that is a single character with a unique code point value;
displaying, by the computing device, the selected emoji characters to the user as suggested emoji characters relevant to the current contextual emotion state of the user;
receiving, by the computing device, user selection of a particular selected emoji character from the selected emoji characters displayed to the user; and
adding the particular selected emoji character to the text inputted by the user.

2. The method of claim 1, further comprising:
determining an ongoing context in which the text inputted by the user pertains;
determining a third emotional state of the user from the ongoing context in which the text inputted by the user pertains,
wherein determining the current contextual emotional state of the user further comprises:
  comparing the first emotional state, the second emotional state, and the third emotional state to one another; and
  when the first emotional state, the second emotional state, and the third emotional state are consistent with one another, ascertaining the current contextual emotional state of the user as a highest degree of the current perceived emotional state of the user.

3. The method of claim 2, wherein determining the current contextual emotional state of the user further comprises:
when two of the first, second, and third emotional states are consistent with one another and a remaining of the first, second, and third emotional states is inapposite, ascertaining the current contextual emotional state of the user as a high degree of the two of the first, second, and third emotional states.

4. The method of claim 3, wherein determining the current contextual emotional state of the user further comprises:
when two of the first, second, and third emotional states are inapposite, ascertaining the current contextual emotional state of the user as a baseline degree of a remaining of the first, second, and third emotional states.

5. The method of claim 4, wherein determining the current contextual emotional state of the user comprises:
when at least one of the first, second, and third emotional states are inconsistent with at least one other of the first, second, and third emotional states, ascertaining the current contextual emotional state of the user as irony.

6. The method of claim 1, wherein the different contextual emotional states to which the emoji characters are mapped comprise multiple degrees of each of one or more base emotional states.

7. A computer program product comprising a memory having stored thereon program instructions executable by a computing device to cause the computing device to:
determine a first emotional state of a user, as a current perceived emotional state of the user from information other than text inputted by the user on the computing device, by one or more of, by one or more of:
  determining the current perceived emotional state from biometric information of the user detected by a biometric sensing device;
  determining the current perceived emotional state from a facial image of the user detected by a camera device;
  determining the current perceived emotional state from recorded audio of the user detected by an audio recording device;
determine a second emotional state, from a semantic content of the text inputted by the user;
determine a current contextual emotional state of the user based on the semantic content of the text inputted by the user and based on the current perceived emotional state of the user by:
  when the first emotional state and the second emotional state are consistent with one another, ascertaining the current contextual emotional state of the user as a high degree of the first emotional state of the user;
  when the first emotional state is inapposite, ascertaining the current contextual emotional state of the user as a baseline degree of the second emotional state;
  when the second emotional state is inapposite, ascertaining the current contextual emotional state of the user as a baseline degree of the first emotional state;
  when the first emotional state and the second emotional state are inconsistent with one another, ascertaining the current contextual emotional state of the user as irony;
from a plurality of emoji characters mapped to different contextual emotional states, determine one or more selected emoji characters that are mapped to the current contextual emotional state of the user, each emoji character being a picture character or pictograph that is a single character with a unique code point value;
display the selected emoji characters to the user as suggested emoji characters relevant to the current contextual emotion state of the user;
receive user selection of a particular selected emoji character from the selected emoji characters displayed to the user; and
add the particular selected emoji character to the text inputted by the user.

8. A computing device comprising:
one or more of:
  a biometric sensing device to detect biometric information of a user;
  a camera device to detect a facial image of the user;
  an audio recording device to detect recorded audio of the user;
a processor;
a memory; and
program instructions stored in the memory and executable by the processor to:
  determine a first emotional state of the user, as a current perceived emotional state of a user from information other than text inputted by the user on the computing device, from one or more of the biometric information, the facial image, and the recorded audio;
  determine semantic content of the text inputted by the user;
  determine a second emotional state of the user, from the semantic content of the text inputted by the user;

determine an ongoing context in which the text inputted by the user pertains;
determine a third emotional state of the user, from the ongoing text in which the text inputted by the user pertains;
determine a current contextual emotional state of the user based on the ongoing context in which the text inputted by the user pertains, based on the semantic content of the text inputted by the user, and based on the current perceived emotional state of the user by:
  comparing the first emotional state, the second emotional state, and the third emotional state to one another;
  when the first emotional state, the second emotional state, and the third emotional state are consistent with one another, ascertaining the current contextual emotional state of the user as a highest degree of the current perceived emotional state of the user;
  when two of the first, second, and third emotional states are consistent with one another and a remaining of the first, second, and third emotional states is inapposite, ascertaining the current contextual emotional state of the user as a high degree of the two of the first, second, and third emotional states;
  when two of the first, second, and third emotional states are inapposite, ascertaining the current contextual emotional state of the user as a baseline degree of a remaining of the first, second, and third emotional states; and
  when at least one of the first, second, and third emotional states are inconsistent with at least one other of the first, second, and third emotional states, ascertaining the current contextual emotional state of the user as irony;
from a plurality of emoji characters mapped to different contextual emotional states, determine one or more selected emoji characters that are mapped to the current contextual emotional state of the user, each emoji character being a picture character or pictograph that is a single character with a unique code point value; and
display the selected emoji characters to the user as suggested emoji characters relevant to the current contextual emotion state of the user;
receive user selection of a particular selected emoji characters displayed to the user; and
add the particular selected emoji character to the text inputted by the user.

\* \* \* \* \*